(12) United States Patent
Grießbach et al.

(10) Patent No.: US 12,483,421 B2
(45) Date of Patent: Nov. 25, 2025

(54) EMBEDDED SYSTEM SUPPORT FOR SECURE TIME-AWARE AUTHENTICATION, ACTING AND SENSING DEVICES

(71) Applicant: NXP B.V., Eindhoven (NL)

(72) Inventors: Jan Grießbach, Hamburg (DE); Ahmad Al Houry, Hamburg (DE); Markus Hinkelmann, Halstenbek (DE); Nicolas Harmen Lehment, Munich (DE)

(73) Assignee: NXP B.V., Eindhoven (NL)

( * ) Notice: Subject to any disclaimer, the term of this patent is extended or adjusted under 35 U.S.C. 154(b) by 405 days.

(21) Appl. No.: 17/733,700

(22) Filed: Apr. 29, 2022

(65) Prior Publication Data

US 2023/0353382 A1  Nov. 2, 2023

(51) Int. Cl.
*H04L 9/32* (2006.01)

(52) U.S. Cl.
CPC .......... *H04L 9/3247* (2013.01); *H04L 9/3215* (2013.01); *H04L 9/3263* (2013.01); *H04L 9/3297* (2013.01)

(58) Field of Classification Search
CPC ... H04L 9/3247; H04L 9/3215; H04L 9/3263; H04L 9/3297
See application file for complete search history.

(56) References Cited

U.S. PATENT DOCUMENTS

| | | | |
|---|---|---|---|
| 7,565,696 B1 | 7/2009 | Njemanze | |
| 10,366,212 B2* | 7/2019 | Thomas | H04L 63/08 |
| 10,419,421 B2* | 9/2019 | Wundsam | H04L 63/0823 |
| 11,728,986 B2* | 8/2023 | Felker | H04L 9/088 380/44 |
| 2002/0056042 A1* | 5/2002 | van der Kaay | H04L 63/12 713/178 |
| 2006/0090084 A1* | 4/2006 | Buer | G06F 21/53 713/189 |
| 2006/0179325 A1 | 8/2006 | Debiez | |
| 2012/0129452 A1* | 5/2012 | Koh | G06Q 20/352 455/41.1 |

(Continued)

FOREIGN PATENT DOCUMENTS

| | | |
|---|---|---|
| DE | 102013106295 A1 | 1/2014 |
| EP | 2395404 A1 | 12/2011 |

OTHER PUBLICATIONS

"NXP EdgeLock SE050—Use Case: Late-Stage Parameter Configuration"; Mar. 2020.

(Continued)

*Primary Examiner* — Jeffrey C Pwu
*Assistant Examiner* — Mayasa A. Shaawat

(57) ABSTRACT

Various implementations relate to controller in a system, including: a device connected to a network; and a secure sub-system connected to the device via a first wired connection, the secure sub-system configured to: establish a trusted channel with a user certificate authority (CA) via a provisioning device; receive application parameters from user CA; provision a timestamp or secure time server information based upon the timestamp or secure time server information received from the user CA; create a device identity for the device; and terminate the trusted channel after provisioning the timestamp or secure time server information and creating the device identity for the device.

19 Claims, 3 Drawing Sheets

(56) References Cited

U.S. PATENT DOCUMENTS

2015/0095648 A1* 4/2015 Nix .................. H04L 12/2854
713/170
2017/0279619 A1* 9/2017 Yang .................. H04L 9/3268

OTHER PUBLICATIONS

NXP EdgeLock SE050—Use Case: Protect Sensor Data; Oct. 2019.
Lee, Y., "A Study on Secure Chip for Message Authentication between a Smart Meter and Home Appliances in Smart Grid", 2013 International Conference on IT Convergence and Security (ICITCS), Dec. 16, 2013.
ISO/IEC International Standard, "Identification cards—Integrated circuit cards—Part 4: Organization, security and commands for interchange", Third Edition, Apr. 4, 2013.

* cited by examiner

EMBEDDED SYSTEM SUPPORT FOR SECURE TIME-AWARE AUTHENTICATION, ACTING AND SENSING DEVICES

TECHNICAL FIELD

Various implementations disclosed herein relate generally to embedded system support for secure time-aware authentication, acting and sensing devices.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various implementations relate to a controller in a system, including: a device connected to a network; and a secure sub-system connected to the device via a first wired connection, the secure sub-system configured to: establish a trusted channel with a user certificate authority (CA) via a provisioning device; receive application parameters from user CA; provision a timestamp or secure time server information based upon the timestamp or secure time server information received from the user CA; create a device identity for the device; and terminate the trusted channel after provisioning the timestamp or secure time server information and creating the device identity for the device.

Various implementations are described, wherein establishing the trusted channel with the user CA via the provisioning device includes: establishing a protected channel between the provisioning device and the user CA; and establishing a provisioning connection between the provisioning device and secure sub-system.

Various implementations are described, wherein the trusted channel includes one or more of authentication, integrity check, and encryption.

Various implementations are described, wherein the provisioning connection is a wireless connection that uses one of a near field communication (NFC) protocol, Bluetooth protocol, 5G protocol, and a Wi-FI protocol.

Various implementations are described, wherein the provisioning connection is a wired connection.

Various implementations are described, wherein the secure sub-system is further configured to perform an identity check of the device with the user CA.

Various implementations are described, wherein the secure sub-system is further configured to provision the device identity in the secure sub-system.

Various implementations are described, wherein the secure sub-system is further configured to certify the device identity by exchanging data with the user CA.

Various implementations are described, wherein the device identity may include one of a signature key to create a signature of sensor data from a sensor, an encryption key to encrypt the sensor data from the sensor, validation keys to verify an actuator command, and decryption keys to decrypt actuator data from an actuator.

Various implementations are described, wherein the secure sub-system is further configured to: receive sensor data from a sensor; attach a secure timestamp to the sensor data; produce a signature of the sensor data and the secure timestamp; and transmit the sensor data, secure timestamp, and signature to an external entity.

Various implementations are described, wherein the secure sub-system is further configured to encrypt the received sensor data and the attached secure timestamp.

Various implementations are described, wherein the secure sub-system is further configured to receive an actuator command including a signature and a time validity range from an external entity; check a validity of the signature of the actuator command; compare a current time with the time validity range; and transmit the actuator command to an actuator when the timestamp is within the time validity range.

Further various implementations relate to a provisioning device for providing a secure sub-system and a device connected to the secure sub-system, including: a memory; a processor connected to the memory configured to: establish a trusted channel between a user certificate authority (CA) the secure sub-system; provision application parameters from the user CA in the secure sub-system; provision a timestamp or secure time server information in the secure sub-system based upon the timestamp or secure time server information received from the user CA; and terminate the trusted channel after provisioning the timestamp or secure time server information.

Various implementations are described, wherein establishing the trusted channel includes: establishing a protected channel between the provisioning device and the user CA; and establishing a connection between the provisioning device and secure sub-system.

Various implementations are described, wherein the trusted channel includes one or more of authentication, integrity check, and encryption.

Various implementations are described, wherein provisioning connection is a wireless connection that uses one of a near field communication (NFC) protocol, Bluetooth protocol, 5G protocol, and a Wi-FI protocol.

Various implementations are described, wherein the processor is further configured to facilitate an identity check of the device with the user CA.

Various implementations are described, wherein the processor is further configured to provision the device identity in the secure sub-system.

Various implementations are described, wherein the processor is further configured to facilitate certification the device identity by a data exchange between the secure sub-system and the user CA.

Various implementations are described, wherein the device identity may include one of a signature key to create a signature of sensor data from a sensor, an encryption key to encrypt the sensor data from the sensor, validation keys to verify an actuator command, and decryption keys to decrypt actuator data from an actuator.

Further various implementations relate to a user certification authority (CA) in a system, comprising: a memory; a processor connected to the memory configured to: establish a trusted channel with a secure sub-system via a provisioning device; transmit application parameters to the secure sub-system; produce a timestamp or secure time server information; provision the timestamp or secure time server information in the secure sub-system; and initiate a creation of a device identity for a device connected to the secure sub-system.

Various implementations are described, wherein the processor further configured to certify the device identity by exchanging data with the secure sub-system.

Various implementations are described, wherein the device identity may include one of a signature key to create a signature of sensor data from a sensor, an encryption key to encrypt the sensor data from the sensor, validation keys to verify an actuator command, and decryption keys to decrypt actuator data from an actuator.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
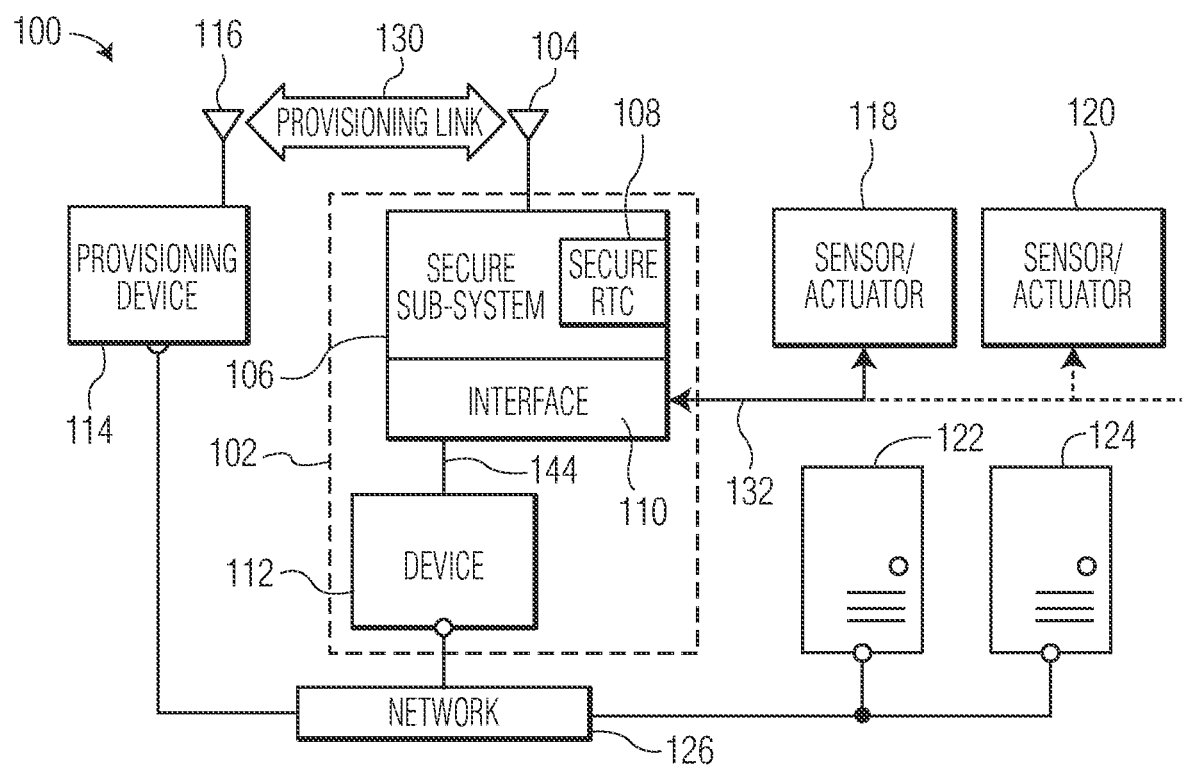
FIG. 1 illustrates a system that implements the provisioning of and the use of a secure timing system.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various implementations described herein are not necessarily mutually exclusive, as some embodiments can be combined with one or more other embodiments to form new embodiments.

In industrial settings, a controller may be used to control actuators and/or receive sensor inputs in an industrial system. Such a system needs to have a time source so that measurements may have an accurate time stamp as well as timing for actuator commands. These systems may be secured in order to resist tampering and attacks.

During enrollment of new devices into an existing secured system, the new devices need to be provisioned with credentials and synchronization to a common time-base. Typically, the device would communicate with a user certification authority (CA) over a secure channel to receive the credentials and query an unsecured timeserver for the current time. Thus, tampering with the timeserver or denying access to it might prompt a device to accept outdated certificates from the user CA or other devices in the network.

These systems often include secure sub-systems in various devices to protect the various devices system from attackers. The secure sub-system may be used to create and facilitate secure channels of communication throughout the system. Further, the secure sub-system may implement various authentication protocols used to authenticate sensor measurements and various commands. The system relies upon a common time-base. Currently, such systems provide insufficient security regarding timing in the system. For example, there is no security regarding the various clocks in the system nor security regarding time synchronization of the system. This lack of security regarding the timing and time-base used in the system provides an avenue for attack. As described above it could affect the validity of security certificates. Also, an attacker could for example change the time stamp on sensor measurements that would cause problems. Also, an attacker could change the time associated with actuator command to further attack the system.

Embodiments of a system and method will be described that provides secure timing to a system during provisioning of that system. This secure time reference may then be used during the operation of the system in order to protect the system from an attacker attacking the timing used in the system.

A certification authority (CA) may provision both credentials and timestamps to a secure processor in a secure sub-system with a real time clock (RTC) within the same cryptographic session. Instead of or in addition to the timestamp, the user CA may provide the means to securely connect to a secure timeserver. This allows for later secure synchronization with said timeserver via a data exchange between the secure sub-system and the user CA. This data exchange either sets the clock (i.e., write a timestamp and make the clock run) or it sets a connection string (address/URL) of the time server and the required public key material to validate the time servers identity. In the latter case, the device may establish a connection to the timeserver and forward the traffic to the secure-sub-system. The secure sub-system will validate the timeserver identity and then request a timestamp to set the clock. For example, a low latency use case may require high precision timestamps, which cannot be directly provided by the user CA. Provisioning of credentials and timestamps may be achieved through a near-field communication (NFC) enabled provisioning device and a secure channel to link the secure processor with the user CA.

Embodiments of a system will be described in which the user CA provisions both credentials and timestamps to a secure processor with a real time clock (RTC) within the same cryptographic session. Thus, a secure common time is established and shared by all devices constituting the secured system. Thus, it is not needed to query the timeserver for certificate validity, for instance. Instead or in addition to the timestamp, the user CA may provide the means to securely connect to a secure timeserver. This allows for later secure synchronization with said timeserver. For example, a low latency use case may require high precision timestamps, which cannot be directly provided by the user CA but could be managed by using a secure synchronization protocol, e.g., network time protocol (NTP). For some use cases, e.g., certification validation as mentioned below, a somewhat accurate synchronization is only needed (i.e., for a few seconds). Provisioning of credentials and timestamps may be achieved through a NFC enabled device and a secure channel to link the secure processor with the user CA. In other embodiments the provisioning may be done using a wired secure channel.

Having this secure processor with a secure RTC that is securely set up allows for the following use cases to be carried out by the various implementations described herein:

Secure Sensing: The secure processor may act as the host device for one or more sensors. Secure timestamps may then be added to readings provided by the integrated sensor before the signature is added, thus adding a secure way to detect delay in transmission. This mechanism adds a defense against attacks based on delaying the transmission of messages.

Secure Actuating Expiration: If instead of a sensor, an actuator driver is connected to a secure processor, commands sent for execution may be paired with an expiry time. This means that a command held back for too long will not be executed, e.g., to prevent valves and doors from opening after too much time has expired. This mechanism adds a defense against attacks based on delaying transmission of messages.

Secure Actuation Scheduling: Commands sent for execution may be given a precise scheduled execution time. This means that a command will only be executed once the scheduled time is reached.

Certificate Validation: This basic setup validates certificates using the local secure timing information. The secure local timing information is used to validate the validity period of cryptographic certificate, e.g., an X.509 certificate.

Various other use cases of systems with sensors, actuators, and controllers may also be implemented using the embodiments described herein while protecting the system timing from attacks.

FIG. 1 illustrates a system that implements the provisioning of and the use of a secure timing system. The system 100 may include a controller 102, a network 126, a user CA 122, a secure time server 124, sensor/actuators 118 and 120, and a provisioning device 114. The controller 102 may include a secure sub-system 106 and a device 112. The controller may be implemented, for example, as a system on chip (SoC), on a printed circuit board (PCB), or as a device with an enclosure. The device 112 may include an unsecured processor, network and other interfaces, control circuits, etc. The secure sub-system 106 provides the necessary elements for the security of the secure processor mentioned above. The secure sub-system 106 may implemented using a tamper-proof secure hardware design. Without loss of generality the secure processor and the secure sub-system 106 may be used equivalently throughout this disclosure. The secure sub-system 106 provides its security services to the controller 102. The implementation is not limited to a composition of embedded components. It may include any type of device composition, e.g., the secure sub-system 106 and the device 112 are parts of the same integrated circuit (IC)/system on chip (SoC), and they may be chiplets, system in a package, or separate dies on the same printed circuit board (PCB) or within the same enclosure. The implementation depends on the security requirements for the secure sub-system 106 (secure processor) and the integration with the secure RTC 108 as well as with the device 112.

The secure sub-system 106 may include a secure RTC 108 that provides a secure timing signals to the secure sub-system 106 as it interacts with other elements in the system 100. The secure RTC 108 may be securely synchronized to a secure time server 124.

Figure 2:
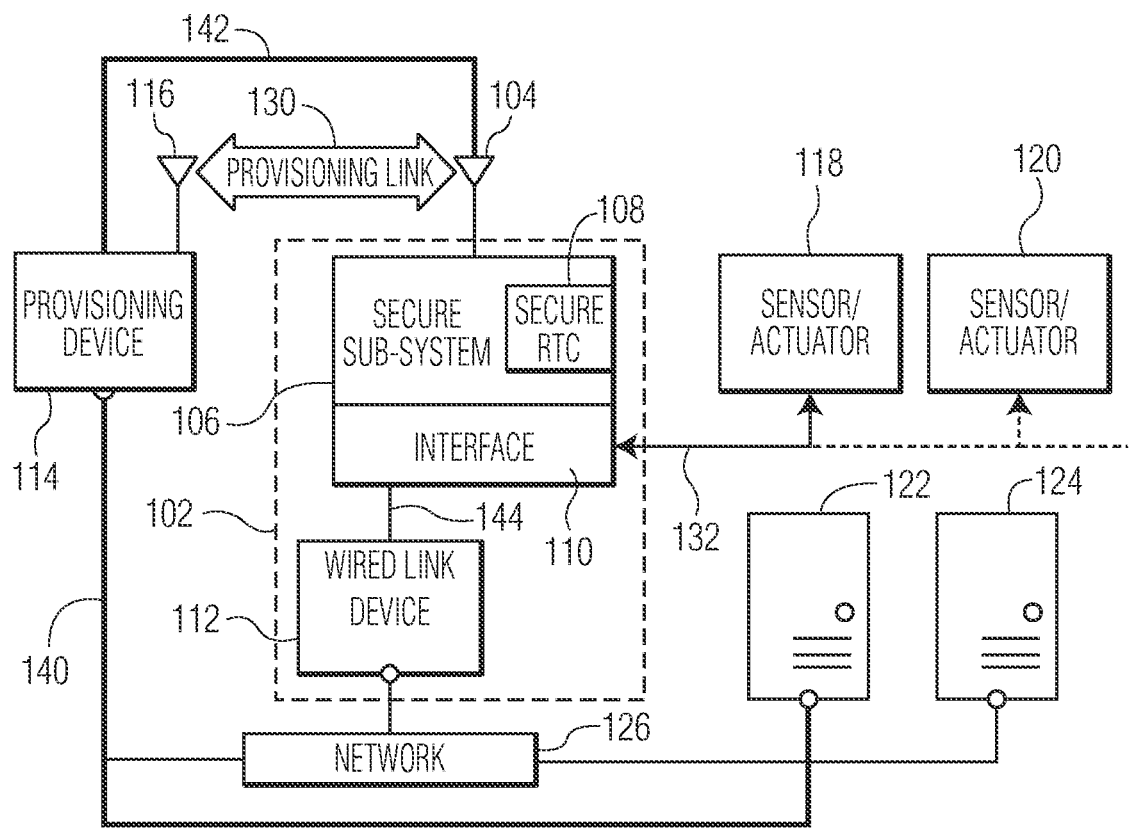
FIG. 2 illustrates a provisioning use case of the system.
Figure 3:
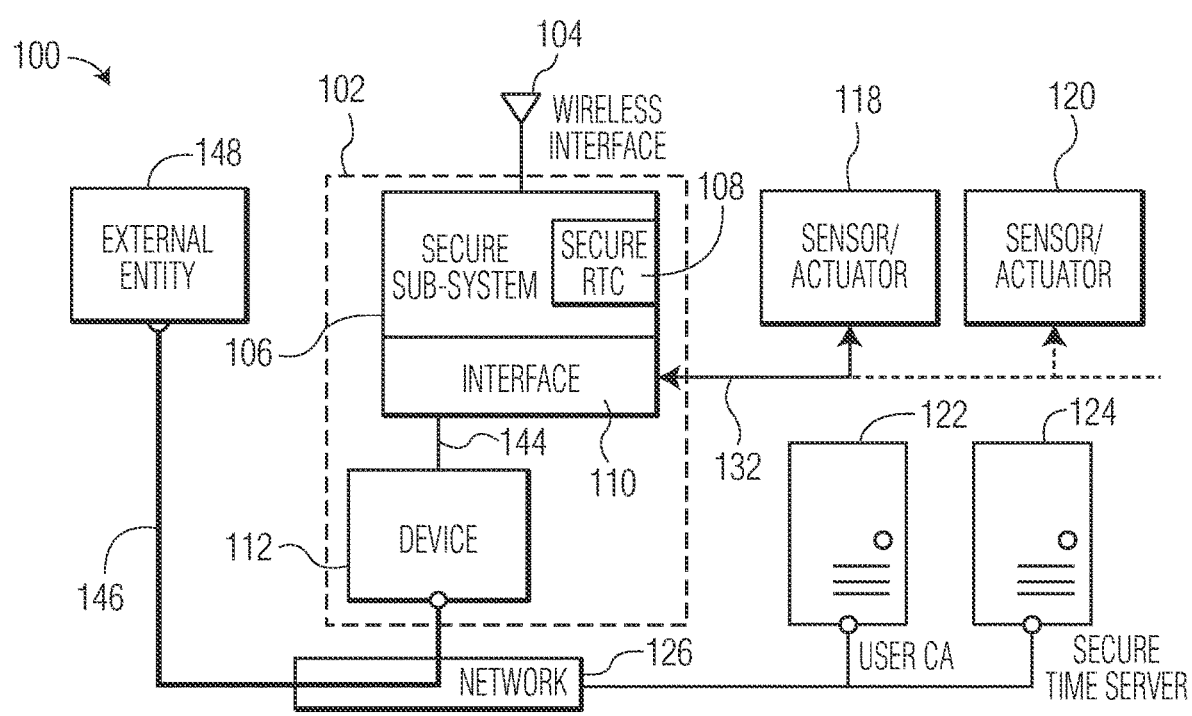
FIG. 3 illustrates a secure sensing/actuation use cases of the system

The secure sub-system 106 may also include an interface 110 that provides various interfaces. Such an interface would not be necessary if the device 112 and secure sub-system 106 are implemented on the same integrated circuit. For example, the interface 110 may provide a wired interface on a wired connection 144 between secure sub-system 106 and the device 112. This wired interface may, for example, be implemented as an inter-integrated circuit ($I^2C$) interface. Also, this interface may be considered a client interface. Further, the interface 110 may provide a wired interface on a wired link 132 between the secure sub-system 106 and the sensor/actuators 118, 120. This interface may also, for example, be implemented as an $I^2C$ interface. This interface may also be considered a primary interface. Finally, the interface 110 may be connected to an antenna 104 to provide a wireless interface to the provisioning device 114 or any other device wherewith the secure sub-system seeks to communicate. This provisioning link 130 may be a wireless link (as illustrated in FIGS. 1-3), for example, NFC, Bluetooth, 5G, Wi-Fi, or any other suitable communication link. In other embodiments the provisioning link 130 may be a wired link, and could also be the same wired link of the device 112.

The sensor/actuators 118, 120 may by any type of sensor or actuator that may be present in, for example, an industrial application. The sensor/actuators 118, 120 may be connected to the secure sub-system 106 using a wired link 132. The secure sub-system 106 may send actuation messages to the sensor/actuators 118, 120 or receive sensor measurements from the sensor/actuators 118, 120. The use of the secure time-basis using the secure RTC 108 and/or the secure time server 124 helps to prevent attackers from modifying time stamps in the system 100.

The user CA 122 is a certificate authority that provides security certificates to be used in the provisioning of the system 100. The certificates may be used to authenticate various parts of the system 100 and may be used to provision various secure channels in the system. The user CA 122 may communicate with other elements in the system using the network 126.

The secure time server 124 may provide a secure time source and basis for the system 100. The secure time server 124 is connected to network 126 in order to provide the needed secure timing throughout the system. The secure time server 124 may be used to securely synchronize the secure RTC 108 in the secure-subsystem. The secure time server 124 may send out secure timing signals or the secure sub-system 106 may log into to the secure time server 124 to receive secure timing.

The network 126 may be any type of network that provides connectivity between the various elements of the system 100. The network 126 may be connected to the provisioning device 114, device 112, user CA 122, and secure time server 124.

The integration of the device boundary may also be broader in that the sensor/actuators 118, 120 of the system may be part of the device 112 or controller 102. Furthermore, the wired connection 144 and link 132 denote trusted links. i.e., the links fulfill the security requirements to be accepted as part of the security architecture of the system 100. The provisioning link 130 and links facilitated by the network 126 do not need to be trusted. Thus, the specific choice of the technology for the communication links is not important, and they may be implemented in many different ways.

An embodiment may include the secure sub-system 106 as a standalone secure element with a secure RTC 108 within one package or integrating them in one IC. In addition, sensor/actuators 118, 120 connected to the secure sub-system 106 via a wired link 132, e.g., $I^2C$, might be included within the same package.

The system 100 also includes a provisioning device 114. The provisioning device 114 may be any type of computing device that is able to communicate with the network 126. Often, the provisioning device 114 will be a mobile device such as a laptop computer, tablet, or mobile phone, but may also be other types of devices as well such as a server or desktop computer. The provisioning device 114 may include a wireless antenna 116 that facilitates wireless communication with the secure sub-system using the provisioning link 130. As previously discussed, this may be implemented using the NFC communication protocol, but other wireless solutions may be used including for example, Wi-Fi, Bluetooth, or mobile phone protocols such as 3G, 4G, or 5G. The provisioning device 114 may also communicate with the network 126. This communication link may be wired or wireless depending upon the user Capabilities of the provisioning device 114 and the network 126.

Various use cases will be described to illustrate the operation of the system. FIG. 2 illustrates a provisioning use case of the system. In FIG. 2 various communication paths are highlighted to illustrate the provision process.

First, the provisioning device 114 establishes a protected channel 140 to the user CA 122, using, e.g., transport lay security (TLS). Second, the provisioning device 114 establishes a channel 142 to the secure sub-system 106 on the controller 102.

Third, via the two channels 140 and 142, the User CA establishes an integrity protected and encrypted channel to the secure sub-system 106. Via this integrity protected and encrypted channel, the following operations are performed. Optionally, the user CA 122 checks the identity of the controller 102 issued by the manufacturer or original equipment manufacture CA (e.g., authentication check/challenge response proven by the secure sub-system 106. This check might be optional if genuineness is not required. It may also include a general integrity check of the device. In some scenarios, also this check may also not be performed because the environment of the system 100 is controlled or the life cycle of the system 100 is in a trusted state that is in line with the security requirements. Next, the user CA 122 provisions the required application parameters to the secure sub-system 106. The application parameters may include, for example, encryption keys, decryption keys, verification keys, and signature keys.

The third step continues when the user CA 122 sets the timestamp or secure time server information (e.g., credentials to access the secure time server 124) and provisions the information to the secure sub-system 106. The user CA 122 requires a suitable device identity. If the device 112 does not have a device identity at this time, the CA may initiate the creation of the device identity. This may be done by either the CA creating an identity for the device and provisioning the identity on the device or the CA requesting the device to create its identity/key when the secure sub-system 106 within device has this capability. The suitable device identity is provisioned in the secure sub-system 106. Depending on the device identity type to be created, the user CA 122 and the secure sub-system 106 may have to exchange data, e.g., to certify the device identity. The device identity may include one of a signature key to create a signature of sensor data from a sensor, an encryption key to encrypt the sensor data from the sensor, validation keys to verify an actuator command, and decryption keys to decrypt actuator data from an actuator. In the user Case of secure sensing, keys to securely create a signature of sensor readings of a sensor may be provisioned. Optionally, encryption keys for the sensor data for secure transmission of the data may be provisioned. In the user Case of secure actuation, validation, keys to verify actuator commands (e.g., by checking the signature of the commands or MAC) may be provisioned. Optionally, decryption keys for the actuator data for secure transmission may be provisioned.

Fourth, all three channels are terminated and the provisioning is concluded.

FIG. 3 illustrates a secure sensing/actuation use cases of the system. The secure sensing use case includes the following steps. First, the device 112 establishes a connection 144 to the secure sub-system 106, e.g., via I²C. Second, a connection is established between the device 112 and an external entity 148 (either device 112 or the external entity 148 may initiate the connection) that shall receive the sensor values from the sensors/actuators 118, 120. The external entity may be any device or system that needs to interact with the sensor/actuators 118, 120. The external entity may provide a user interface to a user that will then allow the user to interact with the system 100.

Third, the device 112 triggers the creation of a sensor reading via the connection 144 to the secure sub-system 106. Next, the secure sub-system 106 communicates with the sensor/actuator 118, 120. The secure sub-system 106 then takes the sensor's response, attaches a secure timestamp to it, and signs the package with its device identity. Optionally, the data is encrypted with a previously provisioned encryption key.

Fourth, the device 112 reads the response from the secure sub-system 106 via the connection 144. Fifth, the device 112 forwards the response to the external entity 148 via the connection 146. Sixth, the external entity may validate the sensor data prior to processing it.

The secure actuation use case includes the following steps. First, the device 112 establishes a connection 144 to the secure sub-system 106, e.g., via I²C. Second, a connection is established between the device 112 and the external entity 148 (either device 112 or the external entity 148 may initiate the connection) that creates the actuator commands. Third, the external entity 148 prepares and signs an actuator command that may contain, for example, a time validity range. Fourth, the device 112 retrieves this actuator command via the connection 146.

Fifth, the device 112 forwards this actuator command for execution to the secure sub-system 106 via the connection 144. The secure sub-system 106 checks the signature of the command and reports an error if the signature is invalid. The secure sub-system 106 compares the current time with the time validity range and reports an error if the current time is out of the time validity range. If the timestamp is within the time validity range, the secure sub-system 106 executes the actuator command on the connected actuator. 118, 120.

The system 100 described herein provides a solution to the technological problem of providing a secure time-base in a system so as to prevent attacks on the system 100 based upon timestamps. This secure time-base benefits various use cases of the system such as secure sensing and secure actuation. Various provisioning steps are carried out to establish the secure time-base in the system.

The system and method described herein may be carried out using specific hardware to perform the actions or software running on a processor may implement the embodiments. The processor may be connected to memory and storage, where the software instructions are stored in the storage. The processor may be any general purpose processor, a graphics processor, a signal processor, or any other type of specialized processor. In this system, the processor and memory may be a secure processor and secure memory.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A controller in a system, the controller comprising:
   a device connected to a network; and
   a secure sub-system connected to the device via a first wired connection, the secure sub-system configured to:
      establish a trusted channel with a user certificate authority (CA) via a provisioning device;
      receive application parameters from the user CA;
      perform an identity check of the device with the user CA;
      provision a timestamp or secure time server information based upon the timestamp or the secure time server information received from the user CA;
      create a device identity for the device and provision the identity on the device, wherein the device identity includes one of a signature key to create a signature of sensor data from a sensor, an encryption key to encrypt the sensor data from the sensor, validation keys to verify an actuator command, and decryption keys to decrypt actuator data from an actuator; and
      terminate the trusted channel after provisioning the timestamp or the secure time server information and creating the device identity for the device.

2. The controller of claim 1, wherein establishing the trusted channel with the user CA via the provisioning device includes:
   establishing a protected channel between the provisioning device and the user CA; and
   establishing the provisioning connection between the provisioning device and secure sub-system.

3. The controller of claim 1, wherein the secure sub-system is further configured to provision the device identity in the secure sub-system.

4. The controller of claim 1, wherein the secure sub-system is further configured to certify the device identity by exchanging data with the user CA.

5. The controller of claim 1, wherein the secure sub-system is further configured to:
   receive sensor data from a sensor;
   attach a secure timestamp to the sensor data;
   produce a signature of the sensor data and the secure timestamp; and
   transmit the sensor data, secure timestamp, and signature to an external entity.

6. The controller of claim 5, wherein the secure sub-system is further configured to encrypt the received sensor data and the attached secure timestamp.

7. The controller of claim 1, wherein the secure sub-system is further configured to:
   receive an actuator command including a signature and a time validity range from an external entity;
   check a validity of the signature of the actuator command;
   compare a current time with the time validity range; and
   transmit the actuator command to an actuator when the timestamp is withing the time validity range.

8. A provisioning device for providing a secure sub-system and a device connected to the secure sub-system, the provisioning device comprising:
   a memory;
   a processor connected to the memory, the processor configured to:
      establish a trusted channel between a user certificate authority (CA) the secure sub-system;
      provision application parameters from the user CA in the secure sub-system;
      facilitate an identity check of the device with the user CA;
      provision a timestamp or secure time server information in the secure sub-system based upon the timestamp or secure time server information received from the user CA;
      create a device identity for the device and provision the identity on the device, wherein the device identity includes one of a signature key to create a signature of sensor data from a sensor, an encryption key to encrypt the sensor data from the sensor, validation keys to verify an actuator command, and decryption keys to decrypt actuator data from an actuator; and
      terminate the trusted channel after provisioning the timestamp or the secure time server information.

9. The provisioning device of claim 8, wherein establishing the trusted channel includes:
   establishing a protected channel between the provisioning device and the user CA; and
   establishing a connection between the provisioning device and secure sub-system.

10. The provisioning device of claim 9, wherein the trusted channel includes one or more of authentication, integrity check, and encryption.

11. The provisioning device of claim 8, wherein provisioning connection is a wireless connection that uses one of a near field communication (NFC) protocol, Bluetooth protocol, 5G protocol, and a Wi-FI protocol.

12. The provisioning device of claim 8, wherein the processor is further configured to provision the device identity in the secure sub-system.

13. The provisioning device of claim 8, wherein the processor is further configured to facilitate certification the device identity by a data exchange between the secure sub-system and the user CA.

14. A user certification authority (CA) in a system, the CA comprising:
   a memory;
   a processor connected to the memory configured to:
      establish a trusted channel with a secure sub-system via a provisioning device;
      transmit application parameters to the secure sub-system;
      produce a timestamp or secure time server information;
      provision the timestamp or secure time server information in the secure sub-system;
      initiate a creation of a device identity for a device connected to the secure sub-system and provisioning of the device identity on the device, wherein the device identity may include one of a signature key to create a signature of sensor data from a sensor, an encryption key to encrypt the sensor data from the sensor, validation keys to verify an actuator command, and decryption keys to decrypt actuator data from an actuator; and
      to certify the device identity by exchanging data with the secure sub-system.

15. The user CA of claim 14, wherein the processor is configured to:
   exchange data with the secure sub-system; and
   in response to exchanging the data:
      set a real time clock (RTC) of the secure sub-system; or
      set a connection string of the time server and public key data to validate the secure time server.

16. The user CA of claim 15, wherein the processor is configured to set the connection string of the time server by:
   establishing a secure connection to the time server; and
   forwarding at least a portion of the data to the secure sub-system.

17. The user CA of claim 16, wherein, in response to receiving the at least the portion of the data, the secure sub-system is configured to validate the secure time server and request a timestamp to set the RTC.

18. The controller of claim 1, wherein the secure sub-system comprises:
   an interface including:
      the first wired connection to the device; and
      one or more second wired connections, each of the one or more second wired connections connected to at least one of a sensor and an actuator.

19. The controller of claim 18, further comprising:
   an antenna configured for wireless communications; and
   wherein the interface is connected to the antenna and configured to enable the secure sub-system to communicate with the provisioning device through a wireless communications link.

* * * * *